United States Patent [19]

Wertz

[11] 4,248,977
[45] Feb. 3, 1981

[54] COATING POWDERS WITH IMPROVED ADHESION

[75] Inventor: William E. Wertz, Reading, Pa.

[73] Assignee: The Polymer Corporation, Reading, Pa.

[21] Appl. No.: 958,523

[22] Filed: Nov. 7, 1978

[51] Int. Cl.³ .................. C08L 63/00; C08L 29/04
[52] U.S. Cl. .................. 525/58; 260/37 N; 260/42.51; 260/37 EP
[58] Field of Search .................. 260/830 P, 837 R; 525/58

[56] References Cited

U.S. PATENT DOCUMENTS

| | | | |
|---|---|---|---|
| 2,713,567 | 7/1955 | Scheibili | 260/837 R |
| 3,058,951 | 10/1962 | Flowers | 260/837 R |
| 3,098,054 | 7/1963 | Rosenberg | 260/837 R |
| 3,449,280 | 6/1969 | Frigstad | 260/830 P |
| 3,462,337 | 8/1969 | Gorton | 260/830 P |
| 3,562,205 | 2/1971 | Richart | 260/37 N |
| 3,657,380 | 4/1972 | Fang | 260/830 P |
| 3,673,273 | 6/1972 | Schmitt | 260/830 P |
| 3,678,127 | 7/1972 | Schmid | 260/830 P |
| 3,880,947 | 4/1975 | Labana | 260/830 P |

FOREIGN PATENT DOCUMENTS

| | | | |
|---|---|---|---|
| 38-1982 | 3/1963 | Japan | 260/830 P |
| 1015408 | 12/1965 | United Kingdom | 260/830 P |

Primary Examiner—Paul Lieberman
Attorney, Agent, or Firm—Richard O. Church

[57] ABSTRACT

Minor amounts of a reactive epoxy resin and a polyvinyl acetal are included within thermoplastic coating powders to improve adhesion to substrates.

5 Claims, No Drawings

COATING POWDERS WITH IMPROVED ADHESION

BACKGROUND OF THE INVENTION

1. Field of the Invention

This invention relates to thermoplastic coating powders adapted to be applied by fusion coating processes and more particularly to thermoplastic coating powders that have improved adhesion to substrates.

2. Description of the Prior Art

Fusion coating processes are those in which a powdered coating material is distributed over a substrate and is heated to cause the powders to fuse into a continuous protective or decorative film. The fluidized bed and the electrostatic spray coating processes are representative of fusion coating processes.

Fusion coating processes are attractive alternatives to solution coatings since solvents are not required. Not only is the cost of solvents saved, but, more importantly, the need for collection and recovery systems to guard against fire, explosions and contamination of the atmosphere is eliminated.

Except in those specialized circumstances in which stripable coatings are desired, the performance of a protective or decorative coating is dependent upon the tenacity with which the coating material adheres to its substrate. Adhesion is necessary to prevent the coating material from being peeled away from the substrate and to protect the substrate from the spread of underfilm corrosion should any discontinuity in the coating layer occur.

It has long been recognized that the adhesion between a coating and a substrate can be very much improved through the use of primers. In recent years primers, variously comprised of reactive thermosetting resins and thermoplastic adhesives have been specially adapted for use in connection with fusion coating processes. Unhappily, these primers are applied to the substrate by solution coating techniques and so, in addition to being a time consuming and bothersome step, some of the advantage of using the solventless fusion coating processes is lost since a solvent recovery system may be required.

To avoid having to prime a substrate, it has been proposed to mix adhesion promoting materials directly into coating powders. For example, U.S. Pat. No. 3,562,205 discloses the use of organic nitrogen compounds and metal fillers to improve the adhesion of thermoplastic coating powders to a substrate. It is known that reactive epoxy resins are useful in improving the ability of nylon to adhere to a substrate. It is also known that the adhesion of nylon coating powders is greatly improved by dry blending a reactive epoxy, a curing agent for the epoxy and a polyvinyl acetal into the powder.

While the inclusion of an epoxy resin, a curing agent, and a polyvinyl acetal as dry blend additives to nylon coating powders will provide markedly improved adhesion, coating powders based upon dry blends are not preferred. Quite generally, dry blends are not satisfactory for use in electrostatic coating processes since the separate components of a dry blend coating powder will differ in their ability to accept a charge, which may lead to disuniformities in the coating. Dry blends may prove unsatisfactory for use in fluidized bed coating processes since the separate components will be removed from the fluidized bed at different rates depending upon such factors as their size, shape, softening point, and density. For these reasons, the higher quality coating powders used in heat fusion processes are prepared by melt mixing the fillers, pigments, stabilizers, plasticizers, etc. into the powder. Most commonly this is done by processing the several raw materials in a mixing extruder, extruding small diameter rods, chopping the rods into pellets and grinding the pellets to the required size.

Attempts to melt mix an epoxy, a curing agent and a polyvinyl acetal with nylon in an extruder have failed since, at the temperature at which the nylon melts, the epoxy becomes reactive and fuses the entire system together into an intractable and useless mass. For this reason, the utility of this preferred system for improving the adhesion of a nylon coating powder has been seriously limited.

Accordingly, it is an object of this invention to improve the adhesion between a substrate and a fused nylon powder coating.

Another object of this invention is to provide melt mixed, homogenous nylon coating powders that, when fused, will adhere to a substrate.

Briefly, these and other objects of this invention are achieved by melt blending minor amounts of a reactive epoxy resin and a polyvinyl acetal into a nylon coating powder while omitting an epoxy curing agent from the formulation. It has been discovered, somewhat predictably, that most epoxies will not react at the melting point of the nylon in the absence of a curing agent for the epoxy; it has been discovered, quite surprisingly, that the omission of the curing agent does not observably reduce the adhesion of the nylon coating powders to a substrate.

The selection of an epoxy resin for use in this invention is not critical and may include epoxy resins having an epoxide equivalent weight of from about 200 to over 2,000. The particular epoxy may be selected, for example, with regard to its melt viscosity so that it may be used to raise or lower the melt viscosity of the coating powders. Quite generally, the additions of expoxies having an epoxy equivalent weight of between 200 to 2,000 and in an amount of from about 2 to 15 parts by weight per 100 parts of nylon have proved useful.

The polyvinyl acetal resins which have been used in the practice of this invention have been limited to those that can readily be obtained in the marketplace which are polyvinyl butyral and polyvinyl formal, although there is no reason to believe that others might not be effective. The polyvinyl acetals are commonly prepared by the saponification of polyvinyl acetate to yield polyvinyl alcohol which, in turn, is acetalated with formaldehyde or butyraldehyde. The resulting resins predominate in polyvinyl acetal with minor residues of polyvinyl alcohol and polyvinyl acetate in the polymeric chain. Polyvinyl acetals are available, for example, from Monsanto under their trademarks Butvar and Formvar and from Farbwerke Hoechst under its trademark Mowital. The inclusion of from about 1 to 10 parts by weight polyvinyl acetal per 100 parts nylon have proved effective.

The nylons that are found most useful in the practice of this invention as coating powders are types 11 and 12 nylon which, due to their lower melting point, make better coating materials than the more common types 6 and 6/6 nylon.

EXAMPLE

The following materials were premixed in a Henschel blender:

| Material | Parts Per 100 By Weight |
|---|---|
| Nylon 11 Molding Resin (Rilsan BMNO) | 100 |
| Epoxy Resin-450-550EEW (Epon 1001) | 7 |
| Polyvinyl Butyral (Mowital B30H) | 3 |
| $CaCO_3$ Filler (Hydrocarb) 90 | 20 |
| $TiO_2$-Pigment | 8 |

The blended materials were then extruded at a die temperature of 400° F. into ⅛ inch rods which were diced into pellets. The pellets were then cryogenically ground to minus 60 mesh for use in a fluidized bed.

The above powders were fluidized and cleaned and degreased 3"×4" steel panels were preheated to 575° F. and coated in the fluidized bed to form an 8 mill fused coating over the panels. The panels were scored with a knife by cutting two intersecting lines in the form of an "X" through the coating down to the surface of the panel.

The panels so prepared were subjected to a continuous spray of salt water having a slat concentration of 5 percent and held at a temperature of about 100° F. These panels were observed at periodic intervals and withstood 1,000 hours of exposure without any observable change in the adhesion of the coating to the panel and without evidence of any underfilm corrosion.

By way of comparison, nylon coatings were applied by a fluidized bed to panels in a manner similar to that discussed above except that no epoxy or polyvinyl acetal was mixed with the nylon. In the tests so performed, it was found that adhesion was lost in less than 24 hours.

I claim:

1. An adherent nylon coating powder comprising about 100 parts by weight of nylon melt mixed with 2 to 5 parts by weight of a reactive epoxy resin and 1 to 10 parts by weight of a polyvinyl acetal characterized in that the coating powder is free from a curing agent for the epoxy.

2. A coating powder according to claim 1 wherein the reactive epoxy has an epoxy equivalent weight of from about 200 to about 2,000.

3. A coating powder according to claim 1 wherein the polyvinyl acetal resin is polyvinyl formal or polyvinyl butyral.

4. A coating powder according to claim 1 wherein the nylon is type 11 or type 12 nylon.

5. A method of obtaining adhesion between a nylon coating powder and a substrate comprising the steps of melt mixing 2 to 15 parts by weight of a reactive epoxy resin and 1 to 10 parts by weight of a polyvinyl acetal with 100 parts by weight of a nylon resin in the absence of an epoxy curing agent and fusing the melt mixed coating powder into a continuous film over a substrate by fusion coating methods.

* * * * *